United States Patent
Yan et al.

(10) Patent No.: US 10,052,760 B2
(45) Date of Patent: Aug. 21, 2018

(54) ROBOT SYSTEM AND SIMULTANEOUS PERFORMANCE CONTROL METHOD THEREOF

(71) Applicant: HANGZHOU DOUBLEWELL INTELLIGENT TECHNOLOGY CO., LTD., Hangzhou, Zhejiang (CN)

(72) Inventors: Yifeng Yan, San Jose, CA (US); Hui Zhang, Zhejiang (CN); Xiaogang Ding, Zhejiang (CN); Mingxuan Cheng, Zhejiang (CN)

(73) Assignee: HANGZHOU DOUBLEWELL INTELLIGENT TECHNOLOGY CO., LTD., Hangzhou (CN)

( * ) Notice: Subject to any disclaimer, the term of this patent is extended or adjusted under 35 U.S.C. 154(b) by 130 days.

(21) Appl. No.: 15/038,053

(22) PCT Filed: Jun. 11, 2014

(86) PCT No.: PCT/CN2014/079684
§ 371 (c)(1),
(2) Date: Jul. 13, 2016

(87) PCT Pub. No.: WO2015/074410
PCT Pub. Date: May 28, 2015

(65) Prior Publication Data
US 2016/0346920 A1    Dec. 1, 2016

(30) Foreign Application Priority Data
Nov. 22, 2013    (CN) .......................... 2013 1 0601216

(51) Int. Cl.
G06F 19/00    (2018.01)
B25J 9/16    (2006.01)
G06N 3/00    (2006.01)

(52) U.S. Cl.
CPC ............. *B25J 9/161* (2013.01); *B25J 9/1682* (2013.01); *G06N 3/008* (2013.01)

(58) Field of Classification Search
CPC .......... B25J 9/161; B25J 9/1682; G06N 3/008
(Continued)

(56) References Cited

U.S. PATENT DOCUMENTS 8,014,897 B2 * 9/2011 Norman ................. A63H 11/00
                                                        180/168
8,374,721 B2 * 2/2013 Halloran ................. A47L 5/30
                                                        318/568.1
(Continued)

FOREIGN PATENT DOCUMENTS

KR    20130104778 A    9/2013

OTHER PUBLICATIONS

1st Office Action of counterpart Chinese Patent Application No. 201310601216.9 dated Aug. 31, 2015.

*Primary Examiner* — Ronnie M Mancho (57) ABSTRACT

A robot system and a simultaneous performance control method thereof, comprising a primary robot and at least one secondary robot. Both the primary robot and the secondary robot respectively comprise a control module (101), a storage module (102), a wireless communication module (103) and an operation execution module (104). The control module (101) is connected to the storage module (102), the wireless communication module (103) and the operation execution module (104), respectively. The robot system and the simultaneous performance control method thereof can implement automatic performance of multiple robots, reduce dependency on a user, and function as a learning tool to provide a lifelike language learning environment for a learner.

12 Claims, 5 Drawing Sheets

(58) Field of Classification Search
USPC .................................................. 700/245, 248
See application file for complete search history.

(56) References Cited

U.S. PATENT DOCUMENTS

| | | | |
|---|---|---|---|
| 8,762,330 B1* | 6/2014 | Kick | G06F 17/30171 707/613 |
| 9,323,250 B2* | 4/2016 | Wang | G05D 1/028 |
| 2005/0166413 A1* | 8/2005 | Crampton | B25J 13/088 33/503 |
| 2006/0149824 A1* | 7/2006 | Park | H04L 69/26 709/206 |
| 2007/0192910 A1* | 8/2007 | Vu | B25J 5/007 700/245 |
| 2009/0234499 A1* | 9/2009 | Nielsen | B25J 9/161 700/250 |
| 2012/0095619 A1* | 4/2012 | Pack | G05D 1/0038 701/2 |
| 2013/0186645 A1* | 7/2013 | Hall | E21B 23/00 166/382 |
| 2013/0325244 A1* | 12/2013 | Wang | G05D 1/028 701/26 |

* cited by examiner

ROBOT SYSTEM AND SIMULTANEOUS PERFORMANCE CONTROL METHOD THEREOF

FIELD OF THE INVENTION

The present invention relates to a field of intelligent control technology, more particularly to a robot system and a simultaneous performance control method thereof.

BACKGROUND OF THE INVENTION

Robots have been introduced into home use market already and been widely used. For example, robots may help people to learn language or provide other amusements.

However, existing home-used robots of study and recreational type are usually used individually. After receiving control commands from the user, the robot may perform actions such as reading, singing, dancing, etc. In this case, existing robots need more involvement of users and the users have to spend more time. In particular when parents use it to teach their children, they have to spend more time and need to be more involved.

SUMMARY OF THE INVENTION

To this end, it is necessary to provide a robot system and a simultaneous performance control method thereof, which can implement automatic performance of multiple robots, reduce dependency on a user, and function as a learning tool to provide a lifelike language learning environment for a learner.

A robot system comprises one primary robot and at least one secondary robot, wherein the primary robot and the secondary robot respectively comprise: a control module, a storage module, a wireless communication module and an operation execution module, wherein the control module is connected to the storage module, the wireless communication module and the operation execution module, respectively, for controlling all parts to work coordinately, wherein the storage module is used for storing programs for simultaneous performance;

wherein the wireless communication module is used for enabling a communication between the primary robot and the at least one secondary robot;

wherein the control module is used for determining, under a default strategy, which simultaneous performance the robot system is going to give after the primary robot and the at least one secondary robot establish a communication connection;

wherein the wireless communication module is also used for establishing a reference point of synchronous clock signals of the primary robot and the at least one secondary robot after the control module determines the simultaneous performance to be implemented;

wherein the control module is also used for reading and executing programs corresponding to the performance according to the reference point of synchronous clock signals and generating control signals for the operation execution module; and wherein the operation execution module is used for executing performance actions according to the control signals.

In one embodiment, the wireless communication module is also used for transmitting programs between the primary robot and the secondary robot under the control of the control module after the primary robot and the at least one secondary robot establish a communication connection in order to realize sharing of programs between the primary robot and the secondary robot.

In one embodiment, the operation execution module include at least one of audio operation execution unit and motor operation execution unit;

wherein the audio operation execution unit may include an audio processing device connected with the control module and a loudspeaker connected with the audio processing device;

wherein the motor operation execution unit may include a mechanical moving device, a motor connected with the mechanical moving device, and a motor driving device connected with the control module and the motor.

In one embodiment, the operation execution module includes an audio operation execution unit and a motor operation execution unit, and further includes an indicator light unit, wherein the indicator light unit comprises an eye indicator light and a mouth indicator light which are respectively connected with the control module;

wherein the eye indicator light may blink under the control of the control module during the operations of the audio operation execution unit or the motor operation execution unit; and wherein the mouth indicator light may blink under the control of the control module during the operating of the audio operation execution unit.

In one embodiment, the primary robot and the secondary robot further comprise an obstacle detecting module, respectively, and the obstacle detecting module comprises at least one of an infrared sensor and an ultrasonic sensor, wherein the infrared sensor and/or the ultrasonic sensor are/is connected with the control module, for detecting obstacle and junction of higher and lower surface during the operations of the motor operation execution unit and sending the detection signals to the control module;

wherein the control module is also used for sending turning round or back-off command to the motor driving device after receiving the detection signals, the motor driving device is used for driving the motor, and the mechanical moving device is used for achieving turning round or back-off of the primary robot or secondary robot.

In one embodiment, the primary robot and the secondary robot further comprise an interface module connected with the control module, for receiving programs transmitted from outside and storing it within the storage module, so as to realize updating of programs of the robot system.

A simultaneous performance control method of a robot system comprises steps as follows:

establishing a communication connection between a primary robot and at least one secondary robot by wireless communication;

determining which simultaneous performance the robot system is going to give under a default strategy by means of the primary robot;

establishing a reference point of synchronous clock signals for simultaneous performance via wireless communication by means of the primary robot and the secondary robot;

according to the reference point of synchronous clock signals, respectively reading and executing corresponding programs for the performance by means of the primary robot and the secondary robot, and generating control signals for the performance of the primary robot and the secondary robot;

according to the control signals, respectively executing operations to give performance by means of the operation execution modules of the primary robot and the secondary robot.

In one embodiment, after the step of establishing the communication connection between the primary robot and at least one secondary robot, the method further comprises a step of transmitting programs back and forth between the primary robot and the secondary robot and realizing sharing of programs.

In one embodiment, the step of respectively executing operations to give performance according to the control signals by means of the operation execution modules of the primary robot and the secondary robot comprises steps as follows:

respectively executing audio operations according to the control signals by means of the operation execution modules of the primary robot and the secondary robot; and/or respectively executing motor operations according to the control signals by means of the operation execution modules of the primary robot and the secondary robot.

In one embodiment, the step of respectively executing operations to give performance according to the control signals by means of the operation execution modules of the primary robot and the secondary robot comprises steps as follows:

respectively executing audio and motor operations according to the control signals by means of the operation execution modules of the primary robot and the secondary robot; and activating corresponding eye indicator light to blink during audio operations or motor operations of the primary robot and the secondary robot; and activating corresponding mouth indicator light to blink during audio operations of the primary robot and the secondary robot.

In one embodiment, the method further comprises steps as follows:

detecting obstacle and junction of higher and lower surface by means of an obstacle detecting module when the primary robot and the secondary robot execute motor movements, wherein the obstacle detecting module comprises at least one of an infrared sensor and an ultrasonic sensor; and executing turning round or back-off operation once the obstacle detecting module of the primary robot or the secondary robot detects an obstacle or a junction of higher and lower surface.

In one embodiment, the method further comprises a step of receiving programs transmitted from outside via the interface module by means of the primary robot or the secondary robot to realize updating of programs.

In the above robot system and the above simultaneous performance control method thereof, since the primary robot and the secondary robot establish a wireless communication connection via the wireless communication modules when they meet, the primary robot determines the program to be simultaneous executed, then the primary robot and the secondary robot establish a reference point of synchronous clock signals for simultaneous performance by means of the wireless communication modules, and after that, the primary robot and the secondary robot respectively execute programs for corresponding performance and generate control signals for respective operation execution modules, and finally the primary robot and the secondary robot respectively give a performance according to the control signals by means of the operation execution modules, the above robot system and the above simultaneous performance control method thereof can reduce dependency on a user and save time and effort for the user when compared with existing equipment.

DETAILED DESCRIPTION OF ILLUSTRATED EMBODIMENTS

In order to make the aims, technical solutions and advantages of the present invention more clear, the present invention will be further explained below in detail with reference to figures and embodiments. It should be noted that the described embodiments are merely intended to illustrate, but not limit the scope of the present invention.

Figure 1:
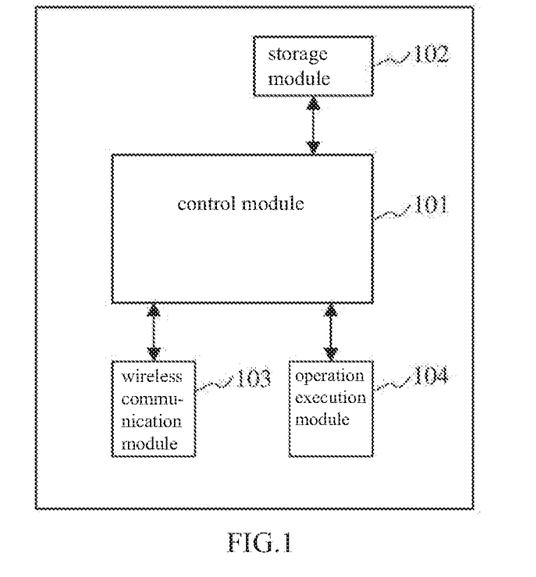
FIG. 1 is a schematic diagram of a primary robot and a secondary robot of a robot system according to one embodiment of the present invention.

Referring to FIG. 1, a robot system is provided in one embodiment. The robot system comprises one primary robot and at least one secondary robot, the structures of which are as shown in FIG. 1.

The primary robot and the secondary robot respectively comprise: a control module 101, a storage module 102, a wireless communication module 103 and an operation execution module 104. The control module 101 is connected to the storage module 102, the wireless communication module 103 and the operation execution module 104, respectively, for controlling all parts to work coordinately. The control module 101 may be a control chip, such as a microprocessor, FPGA (Field-Programmable Gate Array), etc. The storage module 102 is used for storing programs and control commands for simultaneous performance, and it may be a hard disk, a detachable memory card, etc. The wireless communication module 103 is used for enabling wireless communication between the primary robot and the secondary robot of the robot system. For example, it may be a module such as, but not limited to, a WiFi (wireless fidelity) module, a 2G wireless chip, a 3G wireless chip, a 2.4G wireless chip, a Bluetooth module, etc. The respective operation execution modules 104 of the primary robot and the secondary robot are used for giving a performance under the control of the control module 101. In particular, the operation execution module 104 may be configured in different ways in different applications. For example, if the robot system is applied for language learning, the operation execution module 104 may consist of audio operation execution units only, including audio processing devices, loudspeakers, etc. With a plurality of robots playing different roles of different genders, playing audios in English or other languages, simulating various talking scenes for language learning, the system can provide a lifelike language learning environment. For another example, if the robot system is used for entertainment, such as giving a show of multiple robots dancing or skating, the operation execution module 104 may consist of motor operation execution units only, including motor driving devices, motors and mechanical moving devices. Particularly, according to how complicated the mechanical movements are, the motors may be one or more selected from head motor, hand motor and leg motor, and the mechanical moving devices may be roller wheels, sphere shaped devices, etc. Moreover, the operation execution module 104 may also include both audio operation execution unit and motor operation execution unit.

The working principles of the robot system according to the present embodiment are as follows:

The primary robot and the secondary robot recognize each other by means of the wireless communication modules 103 and establish a communication connection. In particular, which one is the primary robot and which one is the secondary robot may be predetermined, or may be determined in a manner that the one which sends a handshake signal first after they meet is served as the primary robot.

The robot system comprises one primary robot and at least one secondary robot, and it is preferred that both robots are used simultaneously, and the primary robot and the secondary robot pre-store same programs for performance. In case the robots of different users may store different programs for performance, the programs may be shared. After the primary robot and the secondary robot establish a communication connection by means of the wireless communication modules 103, the primary robot may request the secondary robot to report an ordered list of the programs, then the primary robot may compare the received list with its stored program number, perform transmission of unstored program to and from the secondary robot by means of the wireless communication modules 103, whereby the programs may be shared. It should be understood that the sharing of programs between the primary and secondary robots may not be necessary if the primary and secondary robots are pre-matched.

Then, according to the stored or shared program list, the control module 101 of the primary robot determines, under a default strategy, which program the robot system is going to execute so as to give a simultaneous performance. For example, the primary robot may determine performance sequence according to the program number or by random.

Once the primary robot determines the number of the program to be executed, it sends the number of the program to be executed to the secondary robot by means of the wireless communication modules 103. Both the primary robot and the secondary robot simultaneously reset the clocks to zero and establish a reference point of synchronous clock signals for simultaneous performance. The control modules 101 of the primary robot and the secondary robot respectively read and execute corresponding programs stored within respective storage module 102, and generate control signals of different time-points for the operation execution module 104.

According to the control signals of different time-points, the operation execution modules 104 of the primary robot and the secondary robot respectively execute different operations, such as audio playing, motor running, etc., thereby achieving a simultaneous performance, such as reading in English, singing, skating, dancing and so on, of the robot system. The primary robot and the secondary robot may give a simultaneous performance, and may be disconnected with each other from the available wireless communication range after finish all performance.

Since the robot system provided in the present embodiment may establish a wireless communication connection by means of the wireless communication modules when the primary robot and the secondary robot meet, determine the program to be simultaneous executed by means of the primary robot, establish a reference point of synchronous clock signals for simultaneous performance of the primary robot and the secondary robot by means of the wireless communication modules, then respectively execute programs for corresponding performance by means of the primary robot and the secondary robot and generates control signals for respective operation execution modules, and respectively give a performance according to the control signals by means of the operation execution modules of the primary robot and the secondary robot, the robot system provided in the present embodiment reduces dependency on a user and save time and effort for the user when compared with existing equipment.

Figure 2:
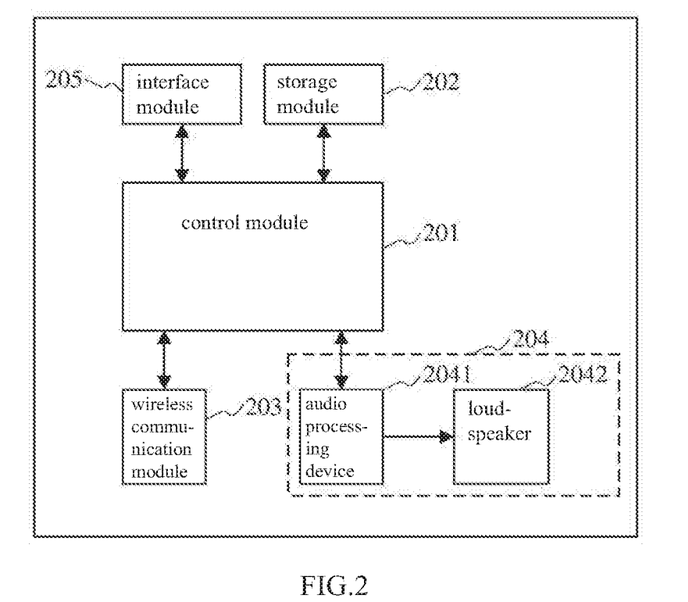
FIG. 2 is a schematic diagram of a primary robot and a secondary robot of a robot system according to another embodiment of the present invention.

Referring to FIG. 2, a robot system is provided in another embodiment. The robot system comprises one primary robot and at least one secondary robot, the structures of which are as shown in FIG. 2.

The primary and secondary robots respectively comprise: a control module 201, a storage module 202, a wireless communication module 203, an operation execution module 204, and an interface module 205. The control module 201 is connected to the storage module 202, the wireless communication module 203, the operation execution module 204, and the interface module 205, respectively, for controlling all parts to work coordinately. The control module 201 may be a control chip, such as a microprocessor, FPGA, etc. The storage module 202 is used for storing programs and control commands for simultaneous performance, and it may be a hard disk, a detachable memory card, etc. The wireless communication module 203 is used for enabling wireless communication between the primary robot and the secondary robot of the robot system. For example, it may be a WiFi (wireless fidelity) module, a Bluetooth module, a 2.4G wireless chip, etc. The respective operation execution modules 204 of the primary robot and the secondary robot are used for giving a performance under the control of the control module 201. In particular, the robots in accordance with the present embodiment are mainly applied for language learning. With the robots playing different roles or different genders and talking to each other, the system can provide a lifelike language learning environment. The operation execution module 204 may consist of audio operation execution units only, including an audio processing device 2041 and a loudspeaker 2042. The audio processing device 2041 is connected with the control module 201 and the loudspeaker 2042. The audio processing device 2041 may be a sound integrated chip with a wide frequency response. The loudspeaker 2042 may be arranged in a cavity which has a reasonable acoustical structure, so as to play a pleasant sound. Accordingly, the storage module 202 may be used for storing audio files, for example, MP3 audio files.

In the present embodiment, the working principles of the control modules 201, the storage modules 202, the wireless communication modules 203 and the operation execution modules 204 of the robot system are as described in the embodiment shown in FIG. 1. The difference is that the operation execution module 204 in the present embodiment may execute operations as follows: the audio processing device 2041 may process the audio files which are read from the storage module 202 by means of the control module 201, amplify the power, and then the loudspeaker 2042 may play. Furthermore, the primary robot and the secondary robot respectively comprise an interface module 205 connected with the control module 201, for receiving and storing programs and audio files transmitted from outside, so as to realize updating of programs and upgrading of robots.

Moreover, in various embodiments, the operation execution modules 204 of the primary and secondary robots may include motor operation execution unit only, or include both audio operation execution unit and motor operation execution unit. The working principle is not repeated here.

Figure 3:
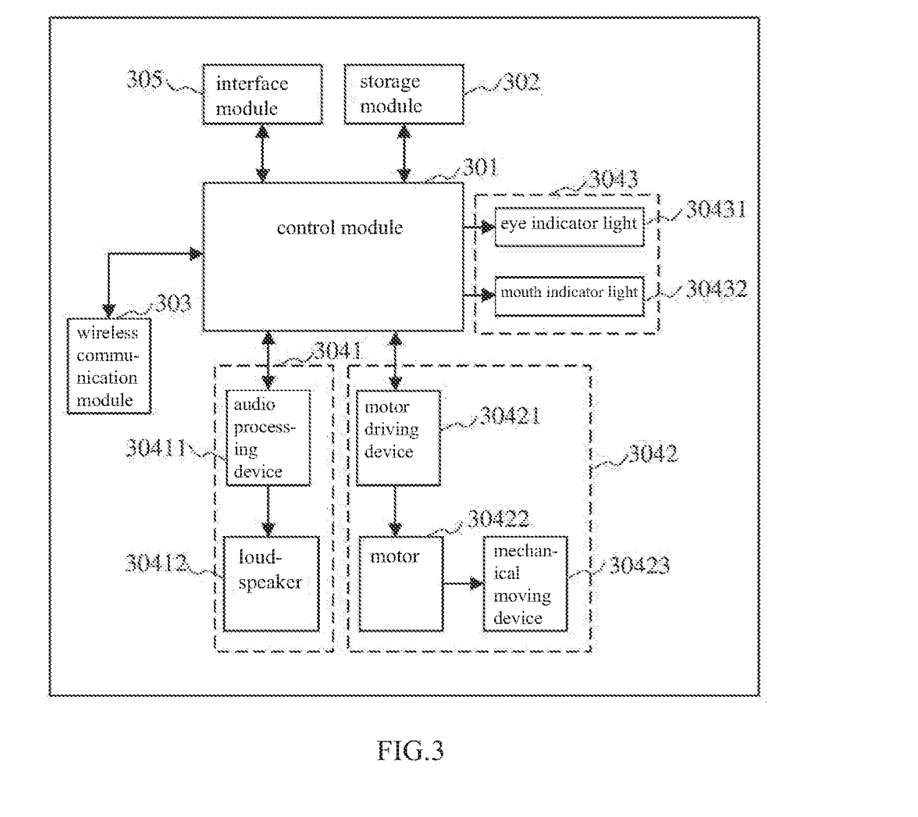
FIG. 3 is a schematic diagram of a primary robot and a secondary robot of a robot system according to a further embodiment of the present invention.

Referring to FIG. 3, it is a schematic diagram of a primary robot and a secondary robot of a robot system according to a further embodiment. The robot system comprises one primary robot and at least one secondary robot. The primary robot and the secondary robot respectively comprise: a control module 301, a storage module 302, a wireless communication module 303, an operation execution module and an interface module 305. The control module 301 is connected to the storage module 302, the wireless communication module 303 and the operation execution module, and the interface module 305, respectively, for controlling all parts to work coordinately. The control module 301 may be a control chip, such as a microprocessor, FPGA, etc. The storage module 302 is used for storing programs and control commands for simultaneous performance, and it may be a hard disk, a detachable memory card, etc. The wireless communication module 303 is used for enabling wireless communication between the primary robot and the secondary robot of the robot system. For example, it may be, but not limited to, a WiFi (wireless fidelity) module, a 2G wireless chip, a 3G wireless chip, a 2.4G wireless chip, a Bluetooth module, etc. The operation execution module comprises an audio operation execution unit 3041, a motor operation execution unit 3042, and an indicator light unit 3043. The audio operation execution unit 3041 comprises an audio processing device 30411 and a loudspeaker 30412. The audio processing device 30411 is connected with the control module 301 and the loudspeaker 30412, respectively. The motor operation execution unit 3042 comprises a motor driving device 30421, a motor 30422 and a mechanical moving device 30423. The motor driving device 30421 is connected with the control module 301 and the motor 30422, and the motor 30422 is connected with the mechanical moving device 30423. In particular, the motor 30422 may be one or more selected from head motor, hand motor and leg motor, and the mechanical moving device 30423 may be roller wheels, sphere shaped devices, etc. According to various types of mechanical movements, various designs may be provided. The indicator light unit 3043 comprises an eye indicator light 30431 and a mouth indicator light 30432, which are connected with the control module 301, respectively.

The working principles of the robot system according to the present embodiment are as follows:

The primary robot and the secondary robot recognize each other by means of the wireless communication modules 303 and establish a communication connection. In particular, which one is the primary robot and which one is the secondary robot may be predetermined, or may be determined in a manner that the one which sends a handshake signal first after they meet is served as the primary robot.

The primary and secondary robots of the robot system according to the present embodiment may transmit programs back and forth to each other by means of the wireless communication modules 303 and realize sharing of programs, similar to the embodiment shown in FIG. 1.

Then, according to the stored or shared program list, the control module 301 of the primary robot determines, under a default strategy, which program the robot system is going to execute so as to give a simultaneous performance.

Once the primary robot determines the number of the programs to be executed, it informs the secondary robot of the programs to be executed to by means of the wireless communication modules 303. Both the primary robot and the secondary robot simultaneously reset the clocks to zero and establish a reference point of synchronous clock signals for simultaneous performance. The control modules 301 of the primary and secondary robots respectively read and execute corresponding programs stored within respective storage module 102, and generate control signals of different time-points for respective operation execution module. The respective control signals include the control signals for the audio operation execution unit 3041, the control signals for the motor operation execution unit 3042, and the control signals for the indicator light unit 3043.

According to the control signals of different time-points, the operation execution modules of the primary and secondary robots respectively execute different operations. For example, playing an audio at a certain time, so as to achieve an audio performance such as poetry reading, singing, etc. When the audio operation execution unit 3041 executes operations, the eye indicator light 30431 and the mouth indicator light 30432 may respectively blink at a specific frequency under the control of the control module 301, wherein blink at different frequencies may have different meanings. For another example, the motor 30422 is driven by the motor driving device 30421 and then drives the mechanical moving device 30423 to move and achieve motions such as dancing and walking, and in the meantime, the eye indicator light 30431 blinks at a certain frequency under the control of the control module 301 while the robots are doing specific motions. For another example, the primary and secondary robots may achieve an audio performance by means of the audio operation execution unit 3041 and achieve a motor performance by means of the motor operation execution unit 3042 all at the same time. Thus, the robot system in accordance with the present embodiment can function as a learning tool, provide a lifelike language learning environment, and give various show performances as well.

Furthermore, the primary robot and the secondary robot respectively comprise an interface module 305 connected with the control module 301, for receiving and storing programs transmitted from outside, so as to realize updating of programs and upgrading of robots. For example, audio source files provided by the parents may be processed and stored in the robots, and it will be easier to grab attentions of children by playing such audio files.

Figure 4:
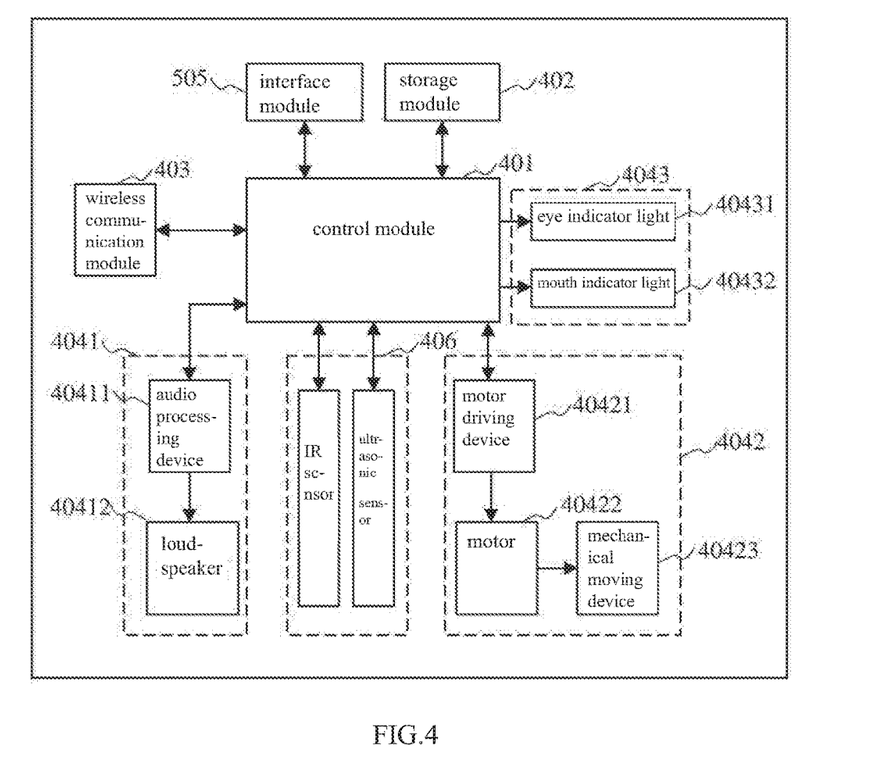
FIG. 4 is a schematic diagram of a primary robot and a secondary robot of a robot system according to a further embodiment of the present invention.

Referring to FIG. 4, it is a schematic diagram of a primary robot and a secondary robot of a robot system according to a further embodiment of the present invention. The robot system comprises one primary robot and at least one secondary robot. The primary and secondary robots respectively comprise: a control module 401, a storage module 402, a wireless communication module 403, an operation execution module, an interface module 405, and an obstacle detecting module 406. The control module 401 is connected to the storage module 402, the wireless communication module 403, the operation execution module, the interface module 405, and the obstacle detecting module 406, respectively, for controlling all parts to work coordinately. The control module 401 may be a control chip, such as a microprocessor, FPGA, etc. The storage module 402 is used for storing programs and control commands for simultaneous performance, and it may be a hard disk, a detachable memory card, etc. The wireless communication module 403 is used for enabling wireless communication between the primary robot and the secondary robot of the robot system. For example, it may be a WiFi (wireless fidelity) module, a 2G wireless chip, a 3G wireless chip, a 2.4G wireless chip, a Bluetooth module, etc. The operation execution module comprises an audio operation execution unit 4041, a motor operation execution unit 4042, and an indicator light unit 4043. The audio operation execution unit 4041 comprises an audio processing device 40411 and a loudspeaker 40412. The audio processing device 40411 is connected with the control module 401 and the loudspeaker 40412, respectively. The motor operation execution unit 4042 comprises a motor driving device 40421, a motor 40422 and a mechanical moving device 40423. The motor driving device 40421 is connected with the control module 401 and the motor 40422, and the motor 40422 is connected with the mechanical moving device 40423. In particular, the motor 40422 may be one or more selected from head motor, hand motor and leg motor, and the mechanical moving device 40423 may be roller wheels, sphere shaped devices, etc. According to various types of mechanical movements, various designs may be provided. The indicator light unit 4043 comprises an eye indicator light 40431 and a mouth indicator light 40432, which are connected with the control module 401, respectively.

In the present embodiment, the working principles of the control modules 401, the storage modules 402, the wireless communication modules 403, the audio operation execution unit 4041, the motor operation execution unit 4042, the indicator light unit 4043, and the interface modules 405 of the primary and secondary robots are as described in the embodiment shown in FIG. 3, and are not repeated here. Such robot system not only can provide a lifelike language learning environment and be applied in learning, but also can give various show performances with body movements.

Compared with the embodiment shown in FIG. 3, the present embodiment has a difference, that is, the primary and secondary robots further comprise an obstacle detecting module 406, respectively. In particular, the obstacle detecting module 406 according to the present embodiment comprises an infrared sensor and an ultrasonic sensor. In various embodiments, the obstacle detecting module may comprise any one of the infrared sensor and the ultrasonic sensor. The infrared sensor and the ultrasonic sensor are respectively connected with the control module 401. When the motor operation execution unit 4042 executes operations, the control module 401 activates the infrared sensor and the ultrasonic sensor to detect obstacles and junction of higher and lower surface (such as stairs), and sends the detection signals to the control module 401. The embodiment is not intended to limit the detection functions and detection directions of the infrared sensor and the ultrasonic sensor. For example, in one application, the ultrasonic sensor may be mounted in the front part of the primary and secondary robots for detecting obstructions such as obstacles raised in front of the robots, and the infrared sensor may be used for detecting the junction of higher and lower surface. Once the infrared sensor or the ultrasonic sensor detects an obstacle or a junction of higher and lower surface, it sends a corresponding detection signal to the control module 401. After receiving the detection signal, the control module 401 immediately sends a turning round or back-off command to the motor driving device 40421. Then, the motor driving device 40421 drives the motor 40422, and the turning round or back-off of the primary robot or secondary robot can be achieved by means of the mechanical moving device 40423. Furthermore, in the present embodiment, in order to save energy, the control module 401 may turn off the ultrasonic sensor and the infrared sensor when the motor operation execution unit 4042 stops operations.

Figure 5:
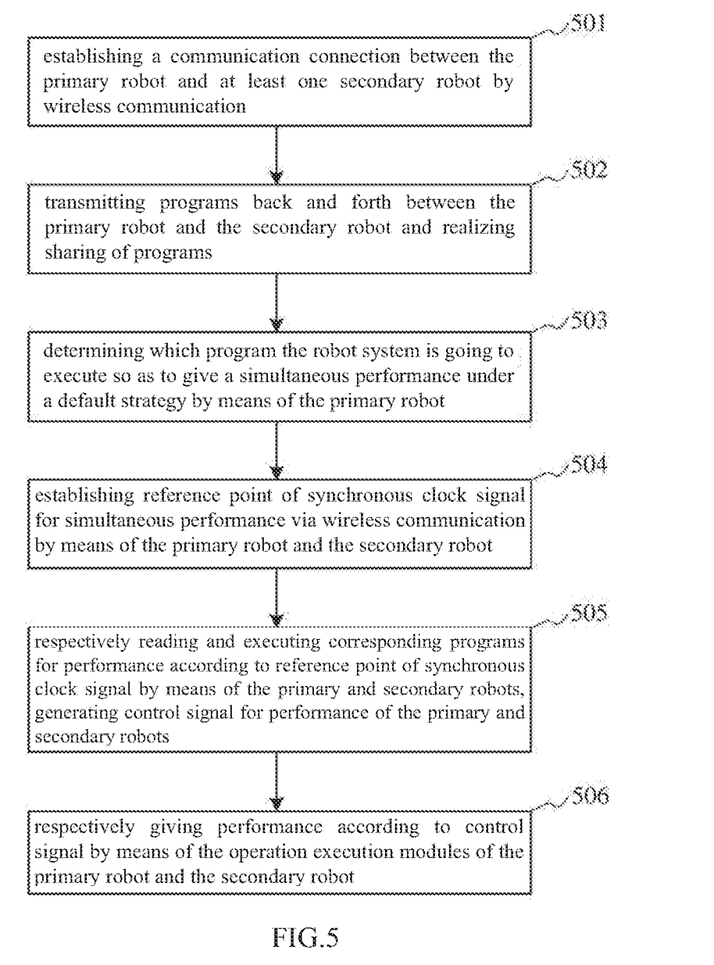
FIG. 5 is a flow diagram of a simultaneous performance control method of a robot system according to one embodiment of the present invention.

Referring to FIG. 5, a simultaneous performance control method of a robot system is provided in one embodiment, wherein the robot system comprises one primary robot and at least one secondary robot, the structures of the primary and secondary robots may refer to the structure shown in FIG. 1. The method comprises steps as follows:

Step 501: establishing a communication connection between the primary robot and at least one secondary robot by wireless communication.

In particular, in the present embodiment, which one is the primary robot and which one is the secondary robot may be predetermined, or may be determined in a manner that the one which sends a handshake signal first after they meet is served as the primary robot.

Step 502: transmitting programs back and forth between the primary robot and the secondary robot and realizing sharing of programs.

In particular, after the primary robot and the secondary robot establish a connection by wireless communication, the primary robot may request the secondary robot to report an ordered list of the programs, then the primary robot may compare the received list with its stored program number, determine the serial numbers of the programs different between the primary robot and the secondary robot, and then the primary robot and the secondary robot may transmit the different programs back and forth to each other by wireless communication, thereby sharing of programs may be realized. In addition, step 502 may not be necessary if the primary and secondary robots are pre-matched for use and store same programs.

Step 503: determining which program the robot system is going to execute so as to give a simultaneous performance under a default strategy by means of the primary robot.

In particular, the primary robot may determine a sequence in which simultaneous performance programs are executed by the robot system according to the program number, or determine a serial number of the program to be executed by random.

Step 504: establishing a reference point of synchronous clock signals for simultaneous performance by means of the primary robot and the secondary robot via wireless communication.

In particular, once the primary robot determines the program to be executed, both the primary robot and the secondary robot simultaneously reset the clocks to zero and establish a reference point of synchronous clock signals for simultaneous performance.

Step 505: according to the reference point of synchronous clock signals, respectively reading and executing the corresponding programs for corresponding performance by means of the primary robot and the secondary robot, and generating control signals for the performance of the primary robot and the secondary robot.

In particular, after the primary robot and the secondary robot establish a reference point of synchronous clock signals, the primary robot and the secondary robot start timing respectively, read and execute the performance programs, and generate control signals corresponding to different operations and different time points of performance.

Step 506: according to the control signals, respectively executing operations to give performance by means of the operation execution modules of the primary robot and the secondary robot.

In particular, according to the control signals, the operation execution modules of the primary robot and the secondary robot respectively execute audio operations or motor movements, such as audio playing, motor running, etc., thereby achieving a simultaneous performance of the robot system, such as reading in English, singing, skating, dancing and so on. In this way, the robot system may be used as a learning tool as well as an entertainment tool. The primary and secondary robots give a simultaneous performance, and are disconnected with each other from available wireless communication range after finish all performances. Furthermore, in the present embodiment, as extended functions, the method comprises controlling corresponding eye indicator light to blink when the primary robot and the secondary robot execute audio operations or motor movements, or controlling corresponding mouth indicator light to blink when the primary robot and the secondary robot execute audio operations. In addition, the method comprises detecting obstacles and junction of higher and lower surface by means of an obstacle detecting module when the primary robot and the secondary robot execute motor movements in order to ensure safe use of the robots, wherein the obstacle detecting module comprises at least one of an infrared sensor and an ultrasonic sensor, and executing operations such as turning round and back-off once the obstacle detecting module of the primary robot or the secondary robot detects an obstacle or a junction of higher and lower surface.

In addition, the primary robot and the secondary robot may receive programs transmitted from outside by means of an interface module, to update performance programs.

Figure 6:
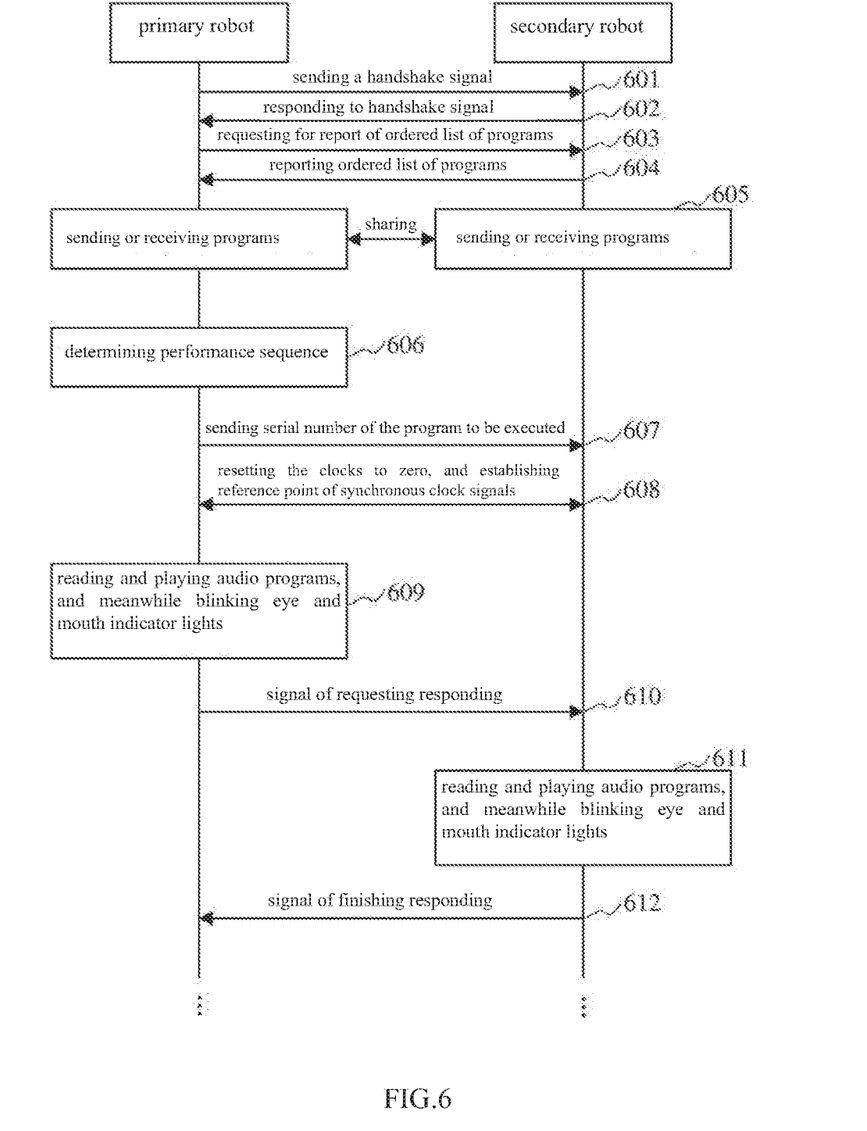
FIG. 6 is a sequence diagram illustrating a simultaneous performance of a primary robot and a secondary robot according to one embodiment of the present invention.

Referring to FIG. 6, it is a sequence diagram illustrating a simultaneous performance of a primary robot and a secondary robot of a robot system according to one embodiment. Preferably, one primary robot and one secondary robot give simultaneous performance in the present embodiment. Particularly, the method comprises steps as follows:

601: Sending a handshake signal from the primary robot to the secondary robot.

602: Responding to the signal by the secondary robot.

603: Requesting the secondary robot to report an ordered list of programs by the primary robot.

604: Reporting the ordered list of programs to the primary robot by the secondary robot.

605: Transmitting programs back and forth to each other by the primary robot and the secondary robot to realize sharing of programs.

606: Determining performance sequence by the primary robot.

607: Sending serial number of the program to be executed to the secondary robot by the primary robot.

608: Simultaneously resetting the clocks to zero by the primary robot and the secondary robot, and establishing a reference point of synchronous clock signals for simultaneous performance.

609: Reading and playing audio programs by the primary robot, and meanwhile activating the eye indicator light and mouth indicator light to blink.

610: Sending a signal of requesting responding, to the secondary robot by the primary robot.

611: Reading and playing audio programs by the secondary robot, and meanwhile activating the eye indicator light and mouth indicator light to blink.

612: Sending a signal of finishing responding, to the primary robot by the secondary robot.

After the step 612, the primary and secondary robots may execute operations such as singing, dancing, self-introducing, obstacle avoiding according to the performance programs, until finish all performances.

One skilled in the art can understand, all or a part of the above procedures described in the above method embodiments can be performed by relevant hardwares controlled by computer programs. The programs may be stored within a computer readable storage medium. The execution of programs may comprise procedures as described in the above embodiments. Thereinto, the storage medium may be a diskette, optical disc, read-only memory (ROM), random access memory (RAM), etc.

The above described embodiments are merely some implementations of the invention, which are illustrated in detail and are not intended to limit the scope of the invention. It should be noted that, the present invention is intended to cover various modifications and equivalent arrangements made by those skilled in the art without departing from the spirit of the invention. The scope of the invention is defined by the appended claims.

What is claimed is:

1. A robot system, characterized in that, it comprises: a primary robot and at least one secondary robot, wherein the primary robot and the secondary robot respectively comprise a control module, a storage module, a wireless communication module and an operation execution module, wherein the control module is connected to the storage module, the wireless communication module and the operation execution module, respectively, for controlling all parts to work coordinately; wherein the storage module is used for storing programs for simultaneous performance;

wherein each said wireless communication module is used for enabling a communication connection between the primary robot and the at least one secondary robot;

wherein the control module of the primary robot is used for requesting the secondary robot to report an ordered list of the programs, then comparing the received list with local stored program number after the primary robot and the at least one secondary robot establish a communication connection;

the wireless communication module of the primary robot is further used for performing transmission of unstored program to and from the secondary robot;

the control module of the primary robot is further used for determining under a default strategy, after the transmission of unstored program is finished, which simultaneous performance the robot system is going to give, and sending the number of the performance to be given to the secondary robot;

wherein each said wireless communication module is also used for respectively resetting clocks to zero and establishing a reference point of synchronous clock signal of the primary robot and the at least one secondary robot after the control module of the primary robot sends the number of the performance to be given to the secondary robot;

wherein each said control module is also used for reading and executing programs corresponding to the performance, and generating control signals of different time-points relative to the reference point of synchronous clock signal for the operation execution module; and wherein each said operation execution module is used for executing different performance actions according to the control signals of different time-points.

2. The robot system according to claim 1, characterized in that: the operation execution module includes at least one of an audio operation execution unit and a motor operation execution unit;

wherein the audio operation execution unit includes an audio processing device connected with the control module and a loudspeaker connected with the audio processing device; and wherein the motor operation execution unit includes a mechanical moving device, a motor connected with the mechanical moving device, and a motor driving device connected with the control module and the motor.

3. The robot system according to claim 2, characterized in that: the operation execution module includes an audio operation execution unit and a motor operation execution unit, and further includes an indicator light unit, wherein the indicator light unit comprises an eye indicator light and a mouth indicator light which are respectively connected with the control module;

wherein the eye indicator light blinks under the control of the control module during the operating of the audio operation execution unit or the motor operation execution unit; and wherein the mouth indicator light blinks under the control of the control module during the operating of the audio operation execution unit.

4. The robot system according to claim 3, characterized in that: the primary robot and the secondary robot further comprise an obstacle detecting module, and the obstacle detecting module comprises at least one of an infrared sensor and an ultrasonic sensor, wherein the infrared sensor and/or the ultrasonic sensor are/is connected with the control module, for detecting obstacle and junction of higher and lower surface during the operations of the motor operation execution unit, and for sending the detection signal to the control module;

wherein the control module is also used for sending turning round or back-off command to the motor driving device after receiving the detection signal, the motor driving device is used for driving the motor, and the mechanical moving device is used for achieving turning round or back-off of the primary robot or secondary robot.

5. The robot system according to claim 1, characterized in that: the primary robot and the secondary robot further comprise an interface module connected with the control module, for receiving programs transmitted from outside and storing it within the storage module, so as to realize program updating of the robot system.

6. A simultaneous performance control method of a robot system, wherein the robot system comprises a primary robot and at least one secondary robot, characterized in that, the method comprises steps as follows:

the primary robot and the secondary robot establishing a communication connection between a primary robot and the at least one secondary robot by wireless communication;

the primary robot requesting the secondary robot to report an ordered list of the programs, then comparing the received list with local stored program number after the primary robot and the at least one secondary robot establish a communication connection, and performing transmission of unstored program to and from the secondary robot, the primary robot determining which simultaneous performance the robot system is going to give under a default strategy, and sending the number of the performance to be given to the secondary robot;

the primary robot and the secondary robot respectively resetting clocks to zero and establishing a reference point of synchronous clock signal for simultaneous performance via wireless communication by the primary robot and the secondary robot;

the primary robot and the secondary robot respectively reading and executing corresponding programs for the performance according to the reference point of synchronous clock signal by the primary robot and the secondary robot, and generating control signals of different time-points relative to the reference point of synchronous clock signal; and the primary robot and the secondary robot respectively executing different operations according to the control signal according to the control signals of different time-points by the operation execution modules of the primary robot and the secondary robot.

7. The method according to claim 6, characterized in that: the step of respectively giving performance according to the control signal by means of the operation execution modules of the primary robot and the secondary robot comprises steps as follows:

respectively giving audio performance according to the control signal by means of the operation execution modules of the primary robot and the secondary robot; and/or respectively giving motor performance according to the control signal by means of the operation execution modules of the primary robot and the secondary robot.

8. The method according to claim 7, characterized in that: the step of respectively giving performance according to the control signal by means of the operation execution modules of the primary robot and the secondary robot further comprises steps as follows:

respectively giving audio performance and motor performance according to the control signal by the operation execution modules of the primary robot and the secondary robot; and controlling corresponding eye indicator light to blink during audio operation or motor operation of the primary robot and the secondary robot; and controlling corresponding mouth indicator light to blink during audio performance of the primary robot and the secondary robot.

9. The method according to claim 8, characterized in that, the method further comprises steps as follows:

detecting obstacle and junction of higher and lower surface by means of an obstacle detecting module when the primary robot and the secondary robot give motor performance, wherein the obstacle detecting module comprises at least one of an infrared sensor and an ultrasonic sensor; and executing turning round or back-off operation if the obstacle detecting module of the primary robot or the secondary robot detects an obstacle or a junction of higher and lower surface.

10. The robot system according to claim 2, characterized in that: the operation execution module includes at least one of an audio operation execution unit and a motor operation execution unit;

wherein the audio operation execution unit includes an audio processing device connected with the control module and a loudspeaker connected with the audio processing device; and wherein the motor operation execution unit includes a mechanical moving device, a motor connected with the mechanical moving device, and a motor driving device connected with the control module and the motor.

11. The robot system according to claim 10, characterized in that: the operation execution module includes an audio operation execution unit and a motor operation execution unit, and further includes an indicator light unit, wherein the indicator light unit comprises an eye indicator light and a mouth indicator light which are respectively connected with the control module;

wherein the eye indicator light blinks under the control of the control module during the operating of the audio operation execution unit or the motor operation execution unit; and wherein the mouth indicator light blinks under the control of the control module during the operating of the audio operation execution unit.

12. The robot system according to claim 11, characterized in that: the primary robot and the secondary robot further comprise an obstacle detecting module, and the obstacle detecting module comprises at least one of an infrared sensor and an ultrasonic sensor, wherein the infrared sensor and/or the ultrasonic sensor are/is connected with the control module, for detecting obstacle and junction of higher and lower surface during the operations of the motor operation execution unit, and for sending the detection signal to the control module;

wherein the control module is also used for sending turning round or back-off command to the motor driving device after receiving the detection signal, the motor driving device is used for driving the motor, and the mechanical moving device is used for achieving turning round or back-off of the primary robot or secondary robot.

* * * * *